US006837181B2

(12) United States Patent
Schulein, Jr. et al.

(10) Patent No.: US 6,837,181 B2
(45) Date of Patent: Jan. 4, 2005

(54) ANIMAL LITTER

(75) Inventors: Benjamin M. Schulein, Jr., St. Louis, MO (US); Marty Johnes, Alton, IL (US)

(73) Assignee: Alfa-Pet, Inc., St. Louis, MO (US)

( * ) Notice: Subject to any disclaimer, the term of this patent is extended or adjusted under 35 U.S.C. 154(b) by 34 days.

(21) Appl. No.: 10/604,231

(22) Filed: Jul. 2, 2003

(65) Prior Publication Data

US 2004/0103852 A1 Jun. 3, 2004

Related U.S. Application Data

(60) Provisional application No. 60/401,600, filed on Aug. 7, 2002.

(51) Int. Cl.⁷ .............................................. A01K 29/00
(52) U.S. Cl. ....................................................... 119/171
(58) Field of Search ................................. 119/171, 172; 424/76.6; 502/400, 401

(56) References Cited

U.S. PATENT DOCUMENTS

| | | | | |
|---|---|---|---|---|
| 4,619,862 A | * | 10/1986 | Sokolowski et al. | 428/221 |
| 5,295,456 A | * | 3/1994 | Lawson | 119/172 |
| 6,568,349 B1 | * | 5/2003 | Hughes et al. | 119/171 |
| 6,745,720 B2 | * | 6/2004 | Rasner et al. | 119/172 |

* cited by examiner

*Primary Examiner*—Son T. Nguyen
(74) *Attorney, Agent, or Firm*—Blackwell Sanders Peper Martin LLP

(57) ABSTRACT

An animal litter consists of wood particles and wood shavings and baking soda. The wood particles and wood shavings are selected from the group consisting of pine and aspen, to thereby provide a litter with optimal absorbency and odor control characteristics.

20 Claims, No Drawings

ANIMAL LITTER

CROSS REFERENCE TO RELATED APPLICATIONS

This application is based upon and claims the benefit of U.S. Provisional Application Ser. No. 60/401,600, filed. Aug. 7, 2002.

BACKGROUND OF INVENTION

The present invention relates generally to the field of animal litters, and particularly to litter formed of wood and sodium bicarbonate. The absorbent litter material is characterized by a pleasant odor, durability, good absorption, and is especially suitable for use as a small animal litter, which effectively absorbs animal waste materials and neutralizes associated unpleasant odors.

The control of pet urine odors is a chronic challenge for those who keep pets on litter, and especially when the litter is maintained in an indoor location. A variety of litter materials have been used, each with somewhat different characteristics, such as greater moisture absorption, comfort for the animal, and odor control by suppression, masking or elimination. Examples of past efforts to control odor include the use of wood shavings, such as white pine shavings, and by use of litter, which clumps upon exposure to moisture, and which urine soaked clumps can then be removed, leaving the non-soiled litter in the litter box for further use by the pet or other animal.

Previously, it has also been known to use aspen particles, chips, shavings, etc. as a litter for animals. However, this material has traditionally often been composed of all aspen, without other woods or substances introduced. Further, these 100% aspen litters were composed of essentially all portions of the tree, including the bark. Although such litters are suitable for use as horticultural mulch, the inclusion of the tree bark causes an appearance which is considered to be unsightly when the material is used as a litter, and particularly a litter for small animals, such as those which would be kept in a person's home, or for use in places of display, such as pet shops.

Other litter compositions including alfalfa or related forage crops are known for their utility as animal litters which effectively absorb animal waste materials and neutralize associated unpleasant odors. For example, alfalfa has been pelletized with starch, as disclosed in U.S. Pat. No. 3,923, 005. Such pellets overcome the disadvantage of earlier pelletized alfalfa by reducing the problem of disintegration of the pellets, which caused the litter material to cling to the animal's feet.

A further improvement of alfalfa pellets was disclosed in U.S. Pat. No. 3,941,090, which discusses pelletizing cedar in combination with alfalfa binders.

U.S. Pat. No. 4,788,936 discloses pelleted bedding for livestock, which bedding includes 4 to 45% by volume of aspen bark, with the balance being a combination of sawdust, ground wood chips and ground lumber. U.S. Pat. No. 5,271,355 discloses absorbent material formed of pelletized poplar wood, preferably aspen, including the tree bark, and peat. Optionally, the material may also include cedar wood.

All of the above references involve absorbent materials that are completely pelletized. However, the process of pelletization is complex and thus expensive. Aspen is especially difficult to pelletize, because it is a hard, dry wood which exacts a toll on the extruding equipment used for the pelletizing process, by causing greater amounts of wear on the equipment parts, resulting in the expense of frequent maintenance and replacement.

U.S. Pat. No. 5,884,584, which issued to the patent application owner herein addressed an absorbent material suitable for animal litter formed of pine, alfalfa and poplar wood, in a specific percentage combination. While not pelletized, that mixture is highly absorbent and has a particularly attractive appearance.

The patent that issued to Cortigene, U.S. Pat. No. 4,203, 388 discloses a litter which contains pelleted and dried cellulose-containing rejects of a paper-making fiber plant and deodorizer materials that may be sodium bicarbonate, the rejections of a secondary paper-making fiber plant consisting essentially of cellulose and mineral fill, and in which the rejects comprise a mixture of the waste rejects and paper broke. As discussed above, the present invention is not a pelleted product and is formed of clean wood, rather than recycled or bark-bearing wood, so as to be especially fresh smelling and absorbent.

SUMMARY OF INVENTION

Thus, because of the above less-than-ideal characteristics, which are common in known small animal litter mixtures, it is among the objects of the present invention to provide an absorbent material which is useful as an animal litter particularly well-suited for small household pets, which is simple to prepare, and thus relatively inexpensive, while also being highly absorbent of both liquids and odors and having an aesthetically pleasing appearance.

It has been discovered that a particular mixture of certain known substances results in a litter which, while useful for large animals as well, is surprisingly well-suited for use with small animals, such as the type often considered for household pets, such as rabbits, guinea pigs, monkeys, mice, gerbils, birds, hamsters, etc. The presently conceived small animal litter is a mixture of wood chips, shavings or the like (particularly yellow pine which has been dyed green in color), and sodium bicarbonate (baking soda). This particular blend of ingredients has a pleasing natural appearance and is lightweight, and highly absorbent of odors and fluids. This ability to absorb fluids and odors is particularly high as a relative ratio of fluids and odors per weight unit of the new litter mixture, when compared to known litters.

This advantage of the new litter is attainable, in large part, because of the use of wood and even more especially because of the use of barkless wood, which is unusually lightweight. Thus, the new litter mixture is more pleasant to have in a home environment for use with pets, particularly when the person caring for the animal happens to be a small child or an elderly or other individual who cannot readily lift heavy containers of known pet litters.

The new litter mixture is also well-suited, for example, for pet stores, zoological parks or other displays frequented by many people, some of whom may be especially easily offended by the odor of animal urine or the appearance of soiled cage litter.

Thus, there is a continuing need for animal litters that provide improved control of animal urine odors emanating from the litter. The new litter must be relatively facile to manufacture and use and should also be reasonably priced. Accordingly, it is among the objects of the present invention to provide an inexpensive and easy to manufacture and use pet litter.

Accordingly, in order to accomplish the above goals, the present invention is, briefly, an animal litter consisting of wood particles and wood shavings and baking soda. The wood particles and wood shavings are pine and/or aspen, to thereby provide a litter with optimal absorbency and odor control characteristics.

These and other advantageous features of the present invention will be in part apparent and in part pointed out herein below.

BRIEF DESCRIPTION OF DRAWINGS

Not applicable.

DETAILED DESCRIPTION

The present invention involves an absorbent material suitable for use as an animal litter and which is composed of a mixture of consisting of wood shavings and/or shredded wood and sodium bicarbonate. Ideally two types of wood product are used, both shredded and strands, for improved characteristics of the mixture as far as texture and absorbency.

The wood of the present invention can be pine, and especially yellow pine, which has either been shaved to a particle size of about ½ inch to about 1 and ½ inches width. The two different textures of pine preferably are mixed to a ratio of approximately 50% each. The baking soda added to the mixed wood is preferably in a range of about 1% to about 6%, by weight.

The wood of the new animal litter can also be partially shredded aspen with thin strands of wood fiber of about ¼ inch to about ½ inch in length. When aspen shavings are used instead of strands the size of the particles varies to about ½ inch square. Further, mixtures of the two types of wood (mixing both aspen and pine) are acceptable, for mixing with the baking soda, in the present invention.

Sodium bicarbonate is added, regardless of the wood selected, because neither aspen or pine or any type has the equivalent deodorizing character or any aroma like cedar that has a camouflaging smell.

EXAMPLE

An absorbent deodorizing animal litter is made of the following components (all components are by weight):

1. Mix—50% Yellow Pine shavings with particle sizes from 1 and ½ to ¾ inches and, 50% Yellow Pine shredded.
2. Mix 280 pounds of the pine mixture of step 1 with 11.2 pounds of baking soda (4% ideal), or baking soda within the range of about 1% to about 10% by weight.

EXAMPLE

An absorbent deodorizing animal litter is made of the following components (all components are by weight):

Mix about 80% shredded aspen with thin strands of wood fiber particles of from about ¼" to about ½" long with about 20% aspen shavings (not strands) sized from about ½ by ½ inch (85% of fibers retained on a 20-mesh screen). Then mix by weight about 500 pounds of the wood shreds/shavings mixture with 20 pounds of baking soda (about 4%). A range of about 5 pounds to about 50 pounds of baking soda are acceptable for this application. The aspen is preferably approximately 191% absorbent.

In the present invention baking soda is added specifically to aspen and to pine particles, because neither has any deodorizing smell or any other aroma, like cedar, that camouflages unpleasant odors. The mixtures of two textures of pine and aspen are used for improved texture feel, and absorbency characteristics of the mixture. Although the examples describe pine mixed with pine, or aspen mixed with aspen, the mixture could also include particles or shavings of pine and particles or shavings of aspen, and so on; i.e., aspen and pine mixed, if preferred.

In view of the foregoing, it will be seen that the several objects of the invention are achieved and other advantages are attained. Although the foregoing includes a description of the best mode contemplated for carrying out the invention, various modifications are conceivable.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. An animal litter consisting of wood particles and wood shavings and baking soda, wherein the wood particles and wood shavings are selected from the group consisting of pine and aspen, to thereby provide a litter with optimal absorbency and odor control characteristics.

2. The litter of claim 1, wherein the wood particles and wood shavings are pine.

3. The litter of claim 2, wherein the pine is yellow pine.

4. The litter of claim 3, wherein the litter has a 50/50 mix of yellow pine shavings to shredded yellow pine.

5. The litter of claim 4, wherein the pine shavings have a particle size ranging from about ½ inch to about 1 and ½ inches in width.

6. The litter of claim 4 wherein the pine is mixed with baking soda at a weight percentage of baking soda in the range of about 1% to about 10%.

7. The litter of claim 6, wherein the mix of pine and baking soda has a weight percentage of baking soda of about 4%.

8. The litter of claim 2, wherein the pine is Ponderosa pine.

9. The litter of claim 2, wherein the pine is white pine.

10. The litter of claim 1, wherein the wood particles and wood shavings are entirely aspen.

11. The litter of claim 10, wherein the aspen is comprised of a mixture of 80% by weight of shredded aspen strands with a wood fiber of ¼ inch to ½ inch in length and 20% aspen shavings with a particle size of about ½ inch square.

12. The litter of claim 11, wherein about 85% of the shredded aspen strands are retained on a number 20 mesh screen.

13. The litter of claim 11, wherein the baking soda is included in the mix of aspen at a weight percent of about 1% to about 6%.

14. The litter of claim 13, wherein the baking soda is included in the mix of aspen at a weight percent of about 4%.

15. The litter of claim 10, wherein the aspen has absorbency of about 191% by weight.

16. An animal litter consisting of wood particles and baking soda, wherein the wood particles are selected from the group consisting of pine and aspen, to thereby provide a litter with optimal absorbency and odor control characteristics.

17. An animal litter consisting of wood shavings and baking soda, wherein the wood shavings are selected from the group consisting of pine and aspen, to thereby provide a litter with optimal absorbency and odor control characteristics.

18. A method of making an animal litter, consisting of:
providing a mixture of wood particles and wood shavings to a preselected size and ratio of particles to shavings;
wherein the wood particles and wood shavings are selected from the group consisting of pine and aspen; and
adding baking soda to a preselected weight percentage of the wood mixture, to thereby provide a litter with optimal absorbency and odor control characteristics.

19. The method of claim 18, and further comprising the step of selecting a mixture of wood particles and wood shavings which is entirely aspen and formed of a mixture of about 80% by weight of shredded aspen strands with a wood fiber of ¼ inch to ½ inch in length and about 20% by weight aspen shavings with a particle size of about ½ inch square.

20. The method of claim 18, and further comprising the step of selecting a mixture of wood particles and wood shavings which is entirely pine in an approximate 50/50 mix of pine shavings to shredded pine, wherein the pine shavings have a particle size ranging from about ½ inch by about 1 and ½ inch, and wherein the pine is mixed with baking soda at a weight percentage of baking soda in the range of about 1% to about 10%.

* * * * *